(12) United States Patent
Wang et al.

(10) Patent No.: US 12,404,824 B2
(45) Date of Patent: Sep. 2, 2025

(54) REINFORCED BULGING TANK OF LAUNCH VEHICLE AND MANUFACTURING METHOD THEREFOR

(71) Applicant: Light-year Explorer (Jiangsu) Space Technology Co., Ltd, Suzhou (CN)

(72) Inventors: Lipeng Wang, Suzhou (CN); Peiying Zhu, Suzhou (CN); Chenlong Liu, Suzhou (CN); Zhongyi Liu, Suzhou (CN)

(73) Assignee: Guangnian Exploration (Jiangsu) Space Technology Co., Ltd, Suzhou (CN)

( * ) Notice: Subject to any disclaimer, the term of this patent is extended or adjusted under 35 U.S.C. 154(b) by 127 days.

(21) Appl. No.: 18/314,270

(22) Filed: May 9, 2023

(65) Prior Publication Data
US 2024/0159204 A1    May 16, 2024

(30) Foreign Application Priority Data
Nov. 15, 2022    (CN) .......................... 202211426624.0

(51) Int. Cl.
*F17C 1/02*    (2006.01)
*C21D 7/12*    (2006.01)
(Continued)

(52) U.S. Cl.
CPC ................ *F02K 9/605* (2013.01); *C21D 7/12* (2013.01); *C22F 1/04* (2013.01); *C22F 1/10* (2013.01); *F17C 1/02* (2013.01); *F17C 1/14* (2013.01); *B23K 2101/006* (2018.08); *B23P 2700/50* (2013.01); *B60K 2015/03032* (2013.01); *C21D 2241/01* (2013.01); *F17C 2201/0109* (2013.01); *F17C 2201/054* (2013.01); *F17C 2203/012* (2013.01); *F17C 2203/0609* (2013.01); *F17C 2203/0643* (2013.01);
(Continued)

(58) Field of Classification Search
CPC ........ F17C 1/08; F17C 1/02; F17C 2203/012; F17C 2270/0197; F17C 2209/2181; B60K 2015/03032; F02K 9/605; Y02E 60/32
See application file for complete search history.

(56) References Cited

U.S. PATENT DOCUMENTS 6,354,457 B1 *  3/2002  Aaron ...................... F17C 1/00
                                                    220/582
2003/0230583 A1   12/2003  Magyar
(Continued)

*Primary Examiner* — Stephen J Castellano

(57) ABSTRACT

The present invention relates to a reinforced bulging tank of a launch vehicle and a manufacturing method therefor. The tank is made of metal material with good plasticity. Firstly, the tank is manufactured by welding annealed plastic metal materials, wherein internal longitudinal reinforcing ribs and internal annular frames/annular plates of barrel sections are welded with a barrel section shell by a low energy laser welding method, and tank bottoms are progressively welded by a plurality of conical sections. Weldments are strengthened and formed through internal pressure bulging under the constraint of external tooling. The outer walls of the barrel sections are not radially deformed under the constraint of a plurality of small width metal rings, and the metal rings are not connected to each other axially. The strength of the materials can be greatly improved by a deep cooling bulging technology.

8 Claims, 6 Drawing Sheets

(51) Int. Cl.
  *C22F 1/04*    (2006.01)
  *C22F 1/10*    (2006.01)
  *F02K 9/60*    (2006.01)
  *F17C 1/14*    (2006.01)
  *B23K 101/00*  (2006.01)
  *B60K 15/03*   (2006.01)

(52) U.S. Cl.
  CPC ............... *F17C 2203/0646* (2013.01); *F17C 2203/0651* (2013.01); *F17C 2209/2181* (2013.01); *F17C 2209/221* (2013.01); *F17C 2209/228* (2013.01); *F17C 2221/012* (2013.01); *F17C 2223/0115* (2013.01); *F17C 2260/011* (2013.01); *F17C 2270/0197* (2013.01)

(56)  References Cited

U.S. PATENT DOCUMENTS

2003/0230584 A1    12/2003  Magyar
  2004/0118855 A1*    6/2004  Calabro .................... F17C 1/00
                                                      220/560.08
  2004/0256395 A1*   12/2004  Lak .......................... F17C 3/04
                                                      220/560.15
  2018/0037105 A1     2/2018  Pearce et al.
  2025/0003553 A1*    1/2025  Yang .................... F17C 13/008

* cited by examiner

REINFORCED BULGING TANK OF LAUNCH VEHICLE AND MANUFACTURING METHOD THEREFOR

TECHNICAL FIELD

The present invention relates to the technical field of structural design and manufacture, in particular to design and manufacture of a low-cost and high-strength tank structure, which can be applied to design and manufacture of a liquid fuel tank of a launch vehicle.

BACKGROUND

The liquid fuel tank is a key structure of a liquid launch vehicle, and is mainly manufactured by the following technologies currently:

1. The liquid fuel tank of the launch vehicle is generally manufactured by high-strength aluminum alloy welding. In order to improve the axial compression stability of the tank, it is necessary to process rib structures on a wall panel of the tank by material reducing and turning milling technology, which leads to a very low material utilization rate and the problems of high material cost, complex processing technology and low manufacturing efficiency, causing constantly high cost of the tank. This becomes one of the main factors that lead to the high cost of the launch vehicle.

2. When high-strength aluminum alloy is used for welding, because weld strength is not high and the thickness of a weld often needs to be greatly increased, the weight of the tank structure is increased and the strength reliability of the weld is still a major weak link of the tank.

3. The tank of the launch vehicle can also be manufactured based on composite materials. The cost of raw materials is high and large winding equipment and curing equipment are needed.

The above industrial situation leads to high manufacturing cost of the liquid tank.

Cold hardening for the materials based on a bulging technology to realize strengthening of the materials is a common technique in the field of pressure vessels. However, the application effect of this technique is limited because the structure under internal pressure tends to be circular deformation and there is a problem of uneven hardening; and there is no report of the application in the manufacture of the liquid tank structure of the launch vehicle.

In conclusion, the existing manufacturing technology of the liquid launch vehicle tank has generally high manufacturing cost, heavy weight and low reliability. Meanwhile, the cold hardening technology of metal is not mature and not applied to the design and manufacture of the launch vehicle tank.

SUMMARY

The purpose of the present invention is to provide a reinforced bulging tank of a launch vehicle and a manufacturing method therefor, to solve the problems of generally high manufacturing cost, heavy weight and low reliability in the existing liquid launch vehicle tank.

To solve the above technical problem, the present invention adopts the following technical solutions:

A metal tank structure comprises: a tank is manufactured by welding metal with good plasticity, comprising a manhole 1, a front bottom 2, a front end frame 3, a front short shell 4, barrel section thickening regions 5, a barrel section body 9, longitudinal reinforcing ribs 7, annular frames 8, annular plates 6, a rear short shell 10, a rear end frame 11 and a rear bottom 12.

Metal materials selected for manufacturing the tank shall satisfy general requirements for serving as tank materials, and shall also have good ductility, good welding performance and easy cold hardening. Superalloy, invar steel, and austenitic stainless steel represented by 301 and 304, and aluminum alloy represented by 5A06 are optional materials. Besides that the circumferential annular frames 8 and the annular plates 6 can select the materials after cold hardening, the materials after heat treatment hardening or other high-strength materials that can be welded with barrel sections, the main structure of the tank is welded and manufactured with annealed materials, which will be cold worked hardening through the subsequent bulging process.

A tank bottom comprises the front bottom 2 and the rear bottom 12 and is formed by welding a plurality of conical metal sheets and a round metal sheet, the manhole 1 is arranged in the middle of the metal sheets at the top of the front bottom, and various inlet and outlet pipelines of the tank are generally designed on the manhole 1 cover; and after the tank bottom 2 or 12 is rounded in a bulging process, the circumferential welds shall be subjected to deformation-relieving stress treatment.

The barrel section body 9 is made to be cylindrical by welding the metal sheets with the same thickness; the length of weldments in the barrel section thickening regions 5 and 9 is less than the length of a finished product tank 5 and 9, and a design length is reached after bulging axial stretching; connecting parts of both ends of the barrel section with the tank bottom 2 or 12 and the short shell 4 or 10 shall be properly thickened than the barrel section body 9; and the length and the thickness of the thickening region 5 shall be designed to satisfy bulging deformation and the strength of the tank after bulging.

The longitudinal reinforcing ribs 7 are processed as "C"-sectional strips by annealed metal sheets and are connected with the shell by a low energy laser welding method. The longitudinal reinforcing ribs 7 are preferably welded on a barrel section shell by using the whole ribs; when the length of the shell is large, the annular plate 6 is arranged at the lap joint of the reinforcing rib; and two end surfaces of the connected reinforcing rib are welded with two surfaces of the annular plate 6 respectively; and the number, the cross section size and the thickness of the longitudinal reinforcing ribs 7 shall be designed to satisfy the axial compression stability and strength of the tank.

The cross section of the annular frame 8 is generally in "C" shape, the cross section size is larger than the longitudinal reinforcing ribs 7, and a groove is formed across the longitudinal reinforcing ribs 7. Similar to the longitudinal reinforcing ribs 7, the annular frames 8 are connected with the barrel section shell in the form of welding. The cross section size and the axial spacing of the annular frames 8 are designed to satisfy the pressure stability of the barrel section of the tank. The basic size of the annular frames 8 is unchanged in the bulging process of the tank, so that the materials after cold hardening, the materials after heat treatment hardening or other high-strength materials that can be welded with barrel sections can be selected.

The function of the annular plates 6 is similar to the annular frames 8, because a ring shape is more suitable to be arranged in the lap joint region of the variable-thickness circumferential weld and the longitudinal reinforcing ribs 7 of the tank. The basic size of the annular plate 6 is unchanged in the bulging process of the tank, so that the materials after cold hardening, the materials after heat treatment hardening or other high-strength materials that can be welded with barrel sections can be selected; and the width and the thickness of the annular plate 6 are designed to satisfy the pressure stability of the barrel section of the tank.

The length dimensions of the short shell 4 or 10 is short and thick, and the short shell 4 or 10 and the end frame 3 or 11, and maximum-diameter conical plates of the tank bottom 2 or 12 are welded to form a structure with a cross section of a right triangle. The length of the short shell 4 or 10 is designed to satisfy the width of the end frame and the connection of the tank with other sections; and the thickness of the short shell 4 or 10 should satisfy the strength requirements under axial load.

The end frame 3 or 11 is connected with the short shell 4 or 10 and the maximum-diameter conical sections of the tank bottom 2 or 12 through welding; a connecting hole is formed on the end frame 3 or 11, and nuts are welded inside for connecting the tank with other sections; before bulging, an evagination frame 13 or 14 is arranged outside the end frame 3 or 11, and the inner end frame and the outer end frame are simultaneously connected with a bulging head 15 or 17 to improve the connection strength and avoid obvious deformation of the end frame 3 or 11 in bulging; and after bulging forming, the evagination frames 13 and 14 are removed by machining to reduce the weight of the finished product tank.

A bulging manufacturing method for a tank comprises: firstly, manufacturing a tank shell by welding metal materials with good plasticity, and then forming the tank through internal pressure bulging cold hardening and strengthening under the constraint of bulging tooling.

The bulging tooling comprises a front head 15, a rear head 17 and a plurality of rings spliced by semi-rings 16.

The inner surface of the head 15 or 17 is the shape of the tank bottom 2 or 12 after bulging; the head 15 or 17 is connected with the tank through the end frame 3 or 11, and the evagination frame 13 or 14; and part of the internal pressure force of the tank bottom 2 or 12 is transferred to the barrel section for stretching the barrel section to harden and deform the barrel section.

The rings are used for restraining the radial deformation of the barrel sections 5 and 9; the width of the rings should not be too large, so as not to cause radial expansion of the barrel section body 9 in bulging; the rings should be easy to disassemble; preferably, two semicircular semi-rings 16 are assembled as a whole ring; the rings are not connected to each other; the installation number of the rings before bulging is designed to clad the whole tank barrel sections 5 and 9; and in the bulging process, as the barrel section body 9 is elongated, more rings are rearranged and supplemented if necessary to ensure that the barrel sections 5 and 9 may not generate obvious radial deformation.

During bulging, liquid is used as a medium for bulging; for some stainless steel materials, cryogenic liquid, such as liquid nitrogen, is used as the medium for bulging, which can play a better strengthening role; and the maximum pressure of bulging forming of the tank is significantly higher than the design pressure of tank.

Compared with the prior art, the above technical solution of the present invention has the following advantages:

1. The present invention can select low-cost stainless steel and aluminum alloy to manufacture high-strength and light-weight tanks, and the material cost is low.

2. The present invention mainly processes the tank materials through welding and bulging technologies, and has high material utilization rate and low manufacturing cost.

3. The welding technology adopted by the present invention is mainly implemented in the annealing state of high plastic material, the difficulty of the welding technology is reduced, and the weld strength and reliability are high.

4. The present invention uses the bulging technology for cold hardening of the tank; the materials are fully strengthened; the structural strength is high and the weight is light; and especially combined with the stainless steel deep cooling as the hardening technology, the tank structure of ultra-high strength can be obtained.

5. The diameter of the barrel sections of the tank is unchanged in the bulging process of the present invention, and the dimensional accuracy of the finished product is high.

DESCRIPTION OF DRAWINGS

The present invention is further described below in combination with description of drawings.

REFERENCE SIGNS OF DESCRIPTION

Figure 1:
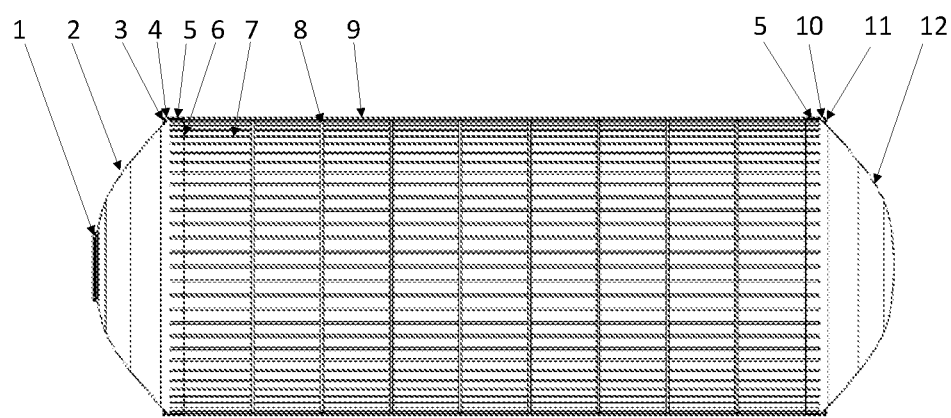
FIG. 1 is a schematic diagram of a structural section of a 2.25m-diameter stainless steel tank after bulging provided in embodiment 1 of the present invention.

1 manhole;
2 front bottom;
3 front end frame;
4 front short shell;
5 barrel section thickening region;
6 annular plate;
7 longitudinal reinforcing rib;
8 annular frame;
9 barrel section body;
10 rear short shell;
11 rear end frame;
12 rear bottom;
13 front evagination frame;
14 rear evagination frame;
15 front head;
16 semi-ring;
17 rear head.

DETAILED DESCRIPTION

The present invention is further described below in combination with drawings and specific embodiments, so that those skilled in the art can better understand and implement the present invention, but the listed embodiments are not used for limiting the present invention.

The above and other technical contents, characteristics and effects of the present invention will be clearly shown below in the detailed description of embodiments in combination with reference drawings. The directional terms such as upper, lower, left, right, front or back mentioned in the following embodiments only refer to the directions in referring to the accompanying drawings. Therefore, the used directional terms are used for illustrating, not limiting, the present invention. In addition, in all embodiments, the same reference signs refer to same elements.

The present invention discloses a reinforced bulging tank of a launch vehicle, comprising a barrel section body 9, barrel section thickening regions 5 arranged on both ends of the barrel section body 9, longitudinal reinforcing ribs 7 arranged on the inner walls of the barrel section body 9 and the barrel section thickening regions 5, and annular frames 8 and annular plates 6 which are matched and reinforced with the longitudinal reinforcing ribs 7;

Wherein a front bottom 2 and a front short shell 4 are installed outside the barrel section thickening regions 5 at one end of the barrel section body 9; and the front bottom 2 and the front short shell 4 are simultaneously connected with the barrel section thickening regions 5.

The barrel section thickening regions 5, a rear short shell 10 and a rear bottom 12 are installed at the other end part of the barrel section body 9; the rear bottom 12 and the rear short shell 10 are simultaneously connected with the barrel section thickening regions 5.

Wherein a front end frame 3 and a front evagination frame 13 are installed on the front short shell 4, and in a bulging process, a front head 15 is connected through the front end frame 3 and the front evagination frame 13.

A rear end frame 11 and a rear evagination frame 14 are installed on the rear short shell 10, and in the bulging process, a rear head 17 is connected through the rear end frame 11 and the rear evagination frame 14.

Wherein a manhole 1 is arranged in the middle of the metal sheet at the top end of the front bottom 2.

Specifically, the barrel section body 9 is made to be cylindrical by welding the metal sheets with the same thickness, wherein the length of weldments in barrel sections is less than the length of the barrel sections of a finished product tank, and a design length is reached after bulging axial stretching.

Wherein the barrel section thickening regions 5 are installed and connected at one end of the barrel section body 9, the front bottom 2 and the front short shell 4; and the barrel section thickening regions 5 are installed and connected at the other end of the barrel section body 9 and the connection between the rear bottom 12 and the rear short shell 10, wherein the length and the thickness of the barrel section thickening regions 5 are designed to satisfy bulging deformation and the strength of the tank after bulging.

In specific embodiments, the longitudinal reinforcing ribs 7 are processed as "C"-sectional strips by annealed metal sheets, and two side edges are welded with the inner walls of the barrel section body 9 and the barrel section thickening regions 5 respectively. The number, the cross section size and the thickness of the longitudinal reinforcing ribs 7 are designed to satisfy the axial compression stability and strength of the tank.

Wherein the cross section of the annular frame 8 is in "C" shape, the cross section size is larger than the longitudinal reinforcing ribs 7, and a groove is formed across the longitudinal reinforcing ribs 7.

The annular plate 6 is installed in a variable-thickness region of the barrel section or a lap joint region of the longitudinal reinforcing ribs 7, wherein the end surface of the longitudinal reinforcing ribs 7 is welded with the surface of the annular plate 6 in the lap joint region of the longitudinal reinforcing ribs 7.

Wherein the annular frames 8 are connected with the inner walls of the barrel section body 9 and the thickening regions 5 in the form of welding.

Wherein the cross section size and the axial spacing of the annular frames 8 are designed to satisfy the pressure stability of the barrel section body 9 and the barrel section thickening regions 5 of the tank. The basic sizes of the annular plates 6 and the annular frames 8 are unchanged in the bulging process of the tank, so that the materials after cold hardening, the materials after heat treatment hardening or other high-strength materials that can be welded with barrel sections can be selected.

Wherein the front short shell 4, the front end frame 3 and maximum-diameter conical plates of the front bottom 2 are welded to form a structure with a cross section of a right triangle.

The rear short shell 10, the rear end frame 11 and maximum-diameter conical plates of the rear bottom 12 are welded to form a structure with a cross section of a right triangle.

Wherein the length of the front short shell 4 and the rear short shell 10 is designed to satisfy the width of the end frame and the connection of the tank with other sections, and the thickness should satisfy the strength requirements under axial load.

Specifically, the front end frame 3 is connected with the front short shell 4 and the maximum-diameter conical sections of the front bottom 2 through welding, wherein a bolt hole for connecting other sections is formed in the front end frame 3, and a front evagination frame 13 is arranged at the front end frame 3 before bulging, wherein in bulging, a front head 15 is installed on the front end frame 3 and the front evagination frame 13.

The rear end frame 11 is connected with the rear short shell 10 and the maximum-diameter conical sections of the rear bottom 12 through welding, wherein a bolt hole for connecting other sections is formed in the rear end frame 11, and a rear evagination frame 14 is arranged at the rear end frame 11 before bulging. In bulging, a rear head 17 is installed on the rear end frame 11 and the rear evagination frame 14.

In specific implementation, the inner surface of the front head 15 is matched and fitted with the outer surface of the front bottom 2 after bulging; and the inner surface of the rear head 17 is matched and fitted with the outer surface of the rear bottom 12 after bulging.

Wherein part of the internal pressure force of the front bottom 2 and the rear bottom 12 in the bulging process is transferred to the barrel section body 9 through the front head 15 and the rear head 17 for stretching the barrel section to harden and deform the barrel section.

The present invention further discloses a manufacturing method for the reinforced bulging tank of the launch vehicle, comprising: firstly, manufacturing a tank shell by welding metal materials with good plasticity, and then forming the tank through internal pressure bulging cold hardening and strengthening under the constraint of external tooling (the barrel section below comprises the barrel section body 9 and the barrel section thickening regions 5).

Firstly, in material selection:

Selected metal materials shall satisfy general requirements for serving as tank materials, and shall also have good ductility, good welding performance and easy cold hardening. Superalloy and invar steel, austenitic stainless steel represented by 301 and 304, and aluminum alloy represented by 5A06 are optional materials. Besides that the circumferential annular frames 8 and the annular plates 6 can adopt the materials after cold hardening, the materials after heat treatment hardening or other high-strength materials that can be welded with barrel sections, the main structure of the tank is welded and manufactured with annealed materials, through bulging cold hardening.

Wherein after the front bottom 2 and the rear bottom 12 are rounded in the bulging process, a circumferential weld shall be subjected to deformation-relieving stress treatment.

Wherein the rings are used for restraining the radial deformation of the barrel sections; the width of the rings should not be too large, so as not to cause radial expansion of the barrel section body 9 after bulging and elongation; the rings should be easy to disassemble; preferably, two semi-rings 16 are assembled as a whole ring; the rings are not connected to each other axially; and the installation number of the rings before bulging is designed to clad the whole tank barrel sections 5 and 9.

During specific bulging, liquid is used as a medium for bulging; and in the bulging process, as the barrel section of the tank is elongated, rings are supplemented as needed for radial reinforcement to ensure that the barrel sections may not generate obvious radial deformation. For some stainless steel materials, cryogenic liquid, such as liquid nitrogen, is used as the medium for bulging, which can play a better strengthening role; and the maximum pressure of bulging forming of the tank is significantly higher than the design pressure of tank to sufficiently elongate the barrel section body 9 to a design value.

Embodiment 1

Figure 2:
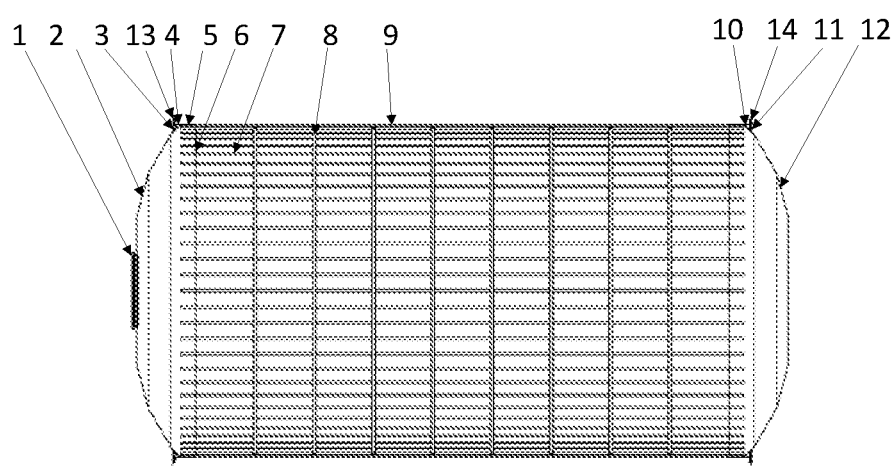
FIG. 2 is a schematic diagram of a structural section of a 2.25m-diameter stainless steel tank before bulging provided in embodiment 1 of the present invention.
Figure 3:
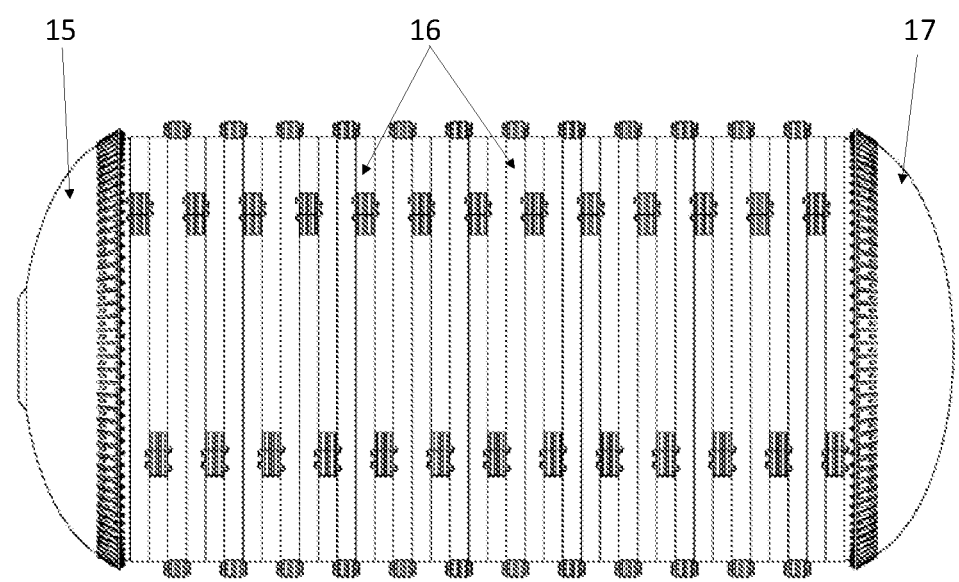
FIG. 3 is a schematic diagram of a bulging tooling of a 2.25m-diameter stainless steel tank provided in embodiment 1 of the present invention.
Figure 4:
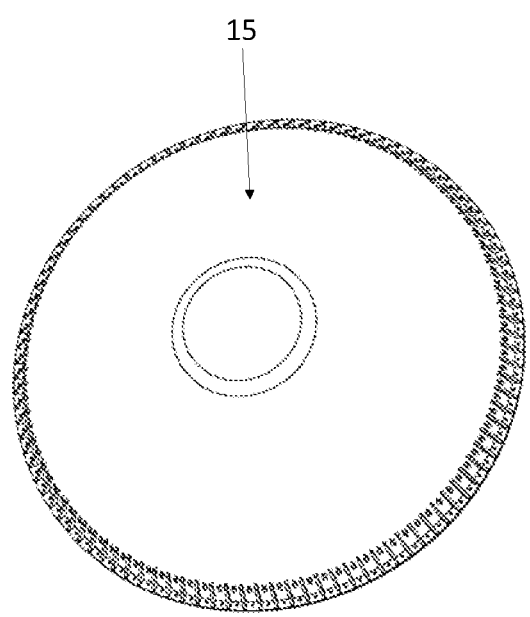
FIG. 4 is a schematic diagram of a front head of a bulging tooling of a 2.25m-diameter stainless steel tank provided in embodiment 1 of the present invention.
Figure 5:
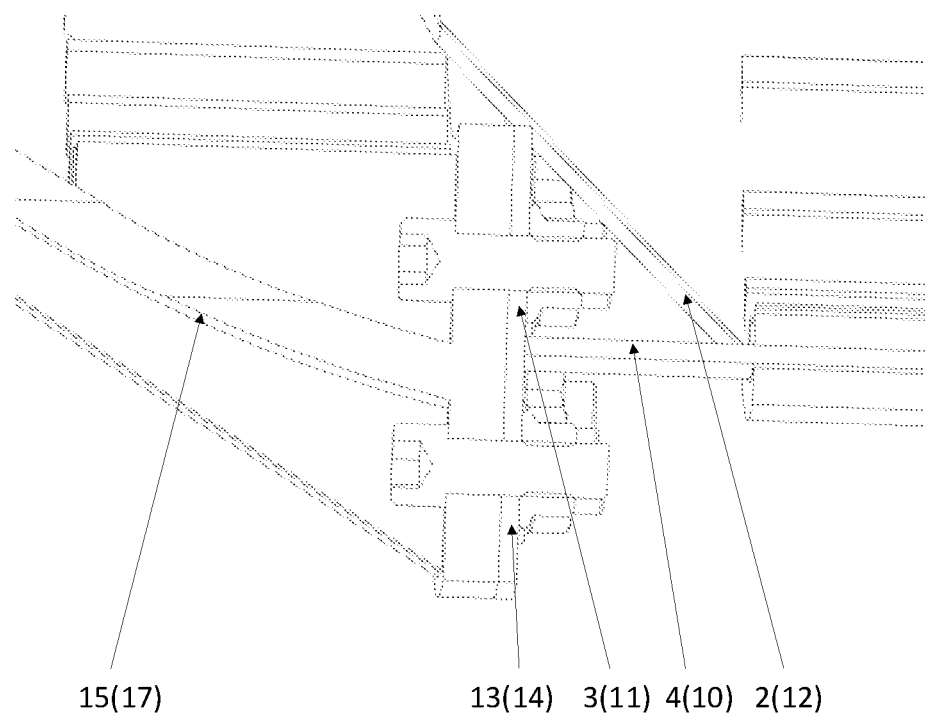
FIG. 5 is a schematic diagram of connection between a front head and a tank in a bulging tooling of a 2.25m-diameter stainless steel tank provided in embodiment 1 of the present invention.
Figure 6:
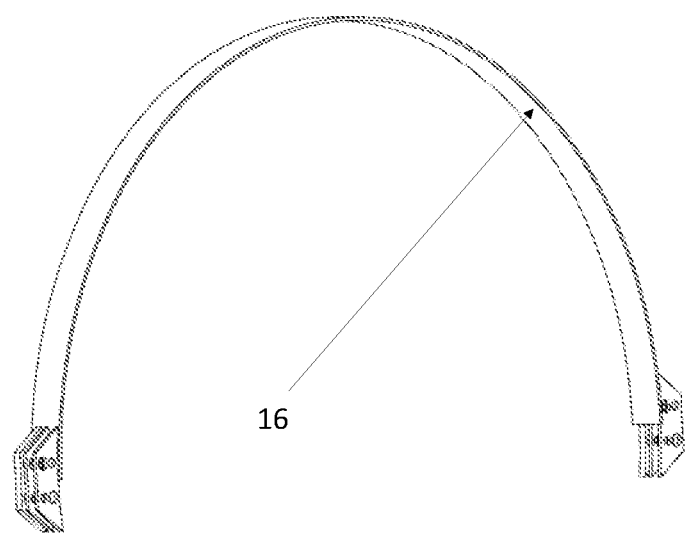
FIG. 6 is a schematic diagram of a semi-ring of a bulging tooling of a 2.25m-diameter stainless steel tank provided in embodiment 1 of the present invention.

In combination with FIG. 1 to FIG. 6, a 2.25m-diameter stainless steel bulging tank comprises:

The tank has an outer diameter of 2.25m, and is welded and manufactured with 304 stainless steel plates, wherein the length of the barrel sections (5 and 9) is 3.8m, the thickness of the barrel section body (9) is 1.2 mm, and the barrel section thickening regions (5) with a width of 100 mm adopts steel plates with a thickness of 4 mm; the wall thickness of the tank bottom (2 or 12) is 1.0 mm; the tank bottom (2 or 12) is formed by welding 3 conical sections and 1 planar circular plate, and the maximum height of the welded tank bottom (2 or 12) is 300 mm; the manhole (1) with a diameter of 500 mm is arranged in the middle of the circular plate of the front bottom (2), and the wall thickness of a covering cap of the manhole (1) is 2 mm; and the short shell (4 or 10) has a height of 50 mm and a thickness of 4 mm. In the present embodiment, the adjacent short shell (4 or 10) and the barrel section thickening regions (5) are made of the same steel plate material; the end frame (3 or 11) has a width of 50 mm and a thickness of 4 mm; and the evagination frame (13 or 14) has a width of 50 mm and a thickness of 4 mm. There are 64 longitudinal reinforcing ribs (7), and each longitudinal reinforcing rib has a section width of 20 mm, a height of 12 mm and wall thickness of 0.6 mm. The above structures are welded and manufactured with annealed 304 stainless steel plates.

Circumferential reinforcement structures adopt two forms of annular frames (8) and annular plates (6), wherein the annular frame (8) has a section width and height of 25 mm and a thickness of 0.6 mm, and is used for the continuous parts of the longitudinal reinforcing ribs (7); and the annular plate (6) has a width of 25 mm and a thickness of 3 mm and is used for lap joint parts of the longitudinal reinforcing ribs (7) and thickness variation parts of the barrel section. A distance between the annular frames (8) and the annular plates (6) is 400 mm. There are 10 annular frames and annular plates in total. The barrel section body (9) with a thickness of 1.2 mm is divided into 9 sections, and the barrel section thickening regions (5) with a thickness of 4 mm and a height of 100 mm at both ends are added, so that the total length of the barrel section of the weldments is 3.8 m. Circumferential reinforcers are made of 304 stainless steel in cold rolled and hardened 3/4H state.

After the tank is welded, under the constraint of heads with an ellipsoidal ratio of 2.0 and 38 sets of rings with a width of 100 mm, hydraulic bulging is adopted, and the maximum pressure is 1.6 MPa. The ellipsoid heads and rings are made of Q345 material, wherein the wall thickness of the ellipsoid head (15 or 17) is 12 mm, and the thickness of the rings is 8 mm. Each set of rings is formed by connecting two detachable semi-rings (16). Each ellipsoid head (15 or 17) is connected with the end frame (3 or 11) and the evagination frame (13 or 14) by two inner and outer rings of 200 M12 bolts.

After internal pressure bulging of 1.6 MPa, the overall bulging rate of the tank reaches 30%; the barrel section body (9) of the tank is elongated by bulging by 30%, and the tank bottom (2 or 12) is bulged into an ellipsoid with an ellipsoidal ratio of 2.0. After bulging, the length of the barrel sections (5 and 9) of the tank is 4.88 m, the distance between the front and rear end frames (3 and 11) is 4.98 m, the depth of the tank bottom (2 or 12) is 562.5 mm, the total length of the tank is 6.005 m, and the total volume is 23 cubic meters.

After bulging, the front and rear evagination frames (13 and 14) are cut off, and the weight of the whole tank finished product is about 498 kg.

Through simulation calculation, the theoretical internal pressure strength of the tank finished product is 0.76 MPa, and the theoretical axial pressure bearing capacity is 4000 kN under 0.2 MPa internal pressure.

The present embodiment shows that based on the technology of the present invention, the design and manufacture of the ultra-thin stainless steel tank are realized, and has the advantages of low material cost, less material waste, mature and reliable technology, and equivalence of finished product performance and the traditional aluminum alloy tank.

Embodiment 2

A 2.25m-diameter aluminum alloy bulging tank comprises:

Based on embodiment 1, the material is changed from the annealed 304 stainless steel to annealed aluminum alloy 5A06, and the 304 stainless steel in cold rolled and hardened 3/4H state is changed to T6 aluminum alloy 2A12, wherein the thickness of the barrel section body is changed to 2.5 mm, the thickness of the barrel section thickening regions is changed to 6.0 mm, and other thicknesses are twice as thick as that in embodiment 1. The number of the longitudinal reinforcing ribs is reduced as 60.

Because the plastic elongation of aluminum alloy is less than that of the 304 stainless steel, the distance between the annular frames and the annular plates of the weldments is increased to 470 mm, the depth of the front and rear bottoms is increased to 380 mm, and the bulging rate is controlled as about 10%.

The total length of the weldments after adjustment is 5.19m, and the bulging pressure is still 1.6 MPa. The exterior dimension after bulging is consistent with that of embodiment 1, the strength of the tank is also equivalent to that of embodiment 1, and the weight of the whole tank is reduced to be less than 400 kg.

The present embodiment shows that the technology disclosed by the present invention can be used for the design of the aluminum alloy tank and the manufacture of more lightweight tank products. Aluminum alloy with low strength, high plasticity and low cost can achieve higher structural efficiency than stainless steel and traditional aluminum alloy tanks.

Embodiment 3

A 5.0m-diameter stainless steel deep cooling bulging tank comprises:

The tank has an outer diameter of 5.0m, and is welded and manufactured with 301 stainless steel plates, wherein the length of the barrel sections is 8.68 m, the thickness of the barrel section body part is 1.5 mm, and the barrel section thickening regions with a width of 100 mm at both ends adopt steel plates with a thickness of 4 mm; the wall thickness of the tank bottom is 1.0 mm; the tank bottom is formed by welding 3 conical sections and 1 planar circular plate, and the maximum height of the welded tank bottom is 1035 mm; the manhole with a diameter of 500 mm is arranged in the middle of the circular plate of the tank bottom, and the wall thickness of a covering cap of the manhole is 1.5 mm; the short shell has a height of 100 mm and a thickness of 4 mm; the end frame has a width of 57 mm and a thickness of 4 mm; and the evagination frame has a width of 50 mm and a thickness of 4 mm. There are 144 longitudinal reinforcing ribs, and each longitudinal reinforcing rib has section width and height of both 15 mm, and wall thickness of 1.0 mm. The above structures are welded and manufactured with annealed 301 stainless steel plates.

Circumferential reinforcement structures adopt two forms of annular frames and annular plates, wherein the annular frame has a section width and height of 25 mm and a thickness of 1.0 mm, and is used for the continuous parts of the longitudinal reinforcing ribs; and the annular plate has a width of 25 mm and a thickness of 3 mm and is used for connection parts of the longitudinal reinforcing ribs and thickness variation parts of the barrel section. A distance between the annular frames and the annular plates is 530 mm. There are 17 annular frames and annular plates in total. The barrel section body is divided into 16 sections, and the barrel section thickening regions with a height of 100 mm at both ends are added, so that the total length of the weldments is 8.68 m. Circumferential reinforcers are made of 301 stainless steel in cold rolled and hardened 3/4H state.

After the tank is welded, under the constraint of heads with an ellipsoidal ratio of 1.6 and 43 sets of rings with a width of 200 mm, the maximum pressure is 1.8 MPa based on liquid nitrogen deep cooling bulging. The ellipsoids and the rings are made of 304 stainless steel resistant to liquid nitrogen temperature. Each set of rings is formed by connecting two detachable semi-rings. Each ellipsoid head is connected with the end frame and the evagination frame by two inner and outer rings of 400 M20 stainless steel bolts.

After internal pressure bulging of 1.8 MPa, the overall bulging rate of the tank reaches 14%; the barrel section body of the tank is elongated by bulging by 14%, and the front and rear bottoms are bulged into ellipsoids with an ellipsoidal ratio of 1.6. After bulging, the length of the barrel sections of the tank is 9.8 m, the distance between the front and rear end frames is 10.0 m, the depth of the tank bottom is 1560 mm, the total length of the tank is 12.12 m, and the total volume is 232 cubic meters.

After bulging, the evagination frames are cut off, and the weight of the whole tank finished product is about 3900 kg.

Through simulation calculation, the theoretical internal pressure strength of the tank finished product is 0.80 MPa, and the theoretical axial pressure bearing capacity is 20000 kN under 0.25 MPa internal pressure.

The present embodiment shows that the combination with stainless steel cryohardening technology can greatly improve the strength of the tank and achieve a higher strength level than aluminum alloy. When this advantage is applied to manufacturing large-diameter stainless steel tanks, higher structural efficiency than traditional aluminum alloy tanks can be achieved.

In conclusion, the present invention provides a metal bulging tank of a launch vehicle and a manufacturing method therefor, which can manufacture a fuel tank of a launch vehicle based on low cost material through welding and bulging technologies, realize material strengthening based on a cold hardening method, solve the problem that the shell and reinforcing ribs cannot be hardened at the same time by the traditional bulging technology, and realize the uniform bulging and hardening of the whole tank. The present invention has the advantages of low material cost, high material utilization rate, simple manufacturing technology, light weight and high strength of the tank structure.

The present invention solves the technical problem of manufacturing the launch vehicle tank with light weight, high strength and high value based on cheap metal material with low strength and high plasticity, and can greatly save the material cost, reduce the manufacturing cost of tank and reduce the use cost of the launch vehicle.

It should be understood in the description of the present invention that terms such as "longitudinal", "transverse", "upper", "lower", "front", "rear", "left", "right", "vertical", "horizontal", "top", "bottom", "inner", "outer", etc. indicate direction or position relationships shown based on the drawings, and are only intended to facilitate the description of the present invention rather than to indicate or imply that the indicated device or element must have a specific direction or constructed and operated in a specific direction, and therefore, shall not be understood as a limitation to the present invention.

The above embodiments only describe preferred embodiments of the present invention, and are not intended to limit the scope of the present invention. On the premise of not departing from the design spirit of the present invention, various modifications and improvements made to the technical solution of the present invention by those ordinary skilled in the art shall fall into the protection scope determined by claims of the present invention.

The invention claimed is:

1. A reinforced bulging tank of a launch vehicle, comprising a barrel section body (9), barrel section thickening regions (5) arranged on both ends of the barrel section body (9), longitudinal reinforcing ribs (7) arranged on inner walls of the barrel section body (9) and the barrel section thickening regions (5), and annular frames (8) and annular plates (6) which are matched and reinforced with the longitudinal reinforcing ribs (7);

wherein a front end surface of the barrel section thickening regions (5) is provided with a front bottom (2) and a front short shell (4); the front bottom (2) is connected with the barrel section thickening regions (5) through the front short shell (4);

a rear end surface of the barrel section thickening regions (5) is provided with a rear short shell (10) and a rear bottom (12); the rear bottom (12) is connected with the barrel section thickening regions (5) through the rear short shell (10);

wherein the front short shell (4) is provided with a front end frame (3);

the rear short shell (10) is provided with a rear end frame (11);

a manhole (1) is arranged in the top middle of the front bottom (2);

wherein the longitudinal reinforcing ribs (7) are processed as "C"-sectional strips by annealed metal sheets, and two side edges are welded with inner wall surfaces of the barrel section body (9) and the barrel section thickening regions (5) respectively through low energy laser.

2. The reinforced bulging tank of the launch vehicle according to claim 1, wherein the barrel section body (9) is made to be cylindrical by welding metal sheets with the same thickness, wherein the length of weldments in barrel sections is less than the length of the barrel sections of a finished product tank, and a design length is reached after bulging axial stretching.

3. The reinforced bulging tank of the launch vehicle according to claim 1, wherein the barrel section thickening regions (5) are formed at one end part of the barrel section body (9) and at the connection between the front bottom (2) and the front short shell (4); and the barrel section thickening regions (5) are formed at another end part of the barrel section body (9) and at the connection between the rear bottom (12) and the rear short shell (10), wherein the length and the thickness of the barrel section thickening regions (5) are designed to satisfy bulging deformation and the strength of the tank after bulging.

4. The reinforced bulging tank of the launch vehicle according to claim 1, wherein the annular frames (8) can be replaced by ring-shaped annular plates (4) of the same thickness, and the ring-shaped annular plates (4) are generally used in variable-thickness connection regions of the barrel section or an axial lap joint of the longitudinal reinforcing ribs (7); when the ring-shaped annular plates are used in the axial lap joint of the longitudinal reinforcing ribs (7), the end surfaces of the reinforcing ribs (7) on both sides are welded respectively with surfaces of the annular plates (4); and sizes of the annular plates (4) are unchanged in the bulging process of the tank, so that the materials after cold hardening, the materials after heat treatment hardening or other high-strength materials that can be welded with barrel sections can be selected.

5. The reinforced bulging tank of the launch vehicle according to claim 1, wherein the front end frame (3) is connected with of the front short shell (4) and maximum-diameter conical sections of the front bottom (2) through welding, wherein the front end frame (3) is provided with a front evagination frame (13) before bulging, and in the bulging process, a front head (15) is installed on the front end frame (3) and the front evagination frame (13);

the rear end frame (11) is connected with the rear short shell (10) and the maximum-diameter conical sections of the rear bottom (12) through welding, wherein the rear end frame (11) is provided with a rear evagination frame (14) before bulging, and in the bulging process, a rear head (17) is installed on the rear end frame (11) and the rear evagination frame (14);

after bulging of the tank, the front evagination frame (13) and the rear evagination frame (14) are removed by machining to reduce the weight of the finished product tank.

6. The reinforced bulging tank of the launch vehicle according to claim 5, wherein the inner surface of the front head (15) is matched and fitted with the outer surface of the front bottom (2) after bulging; and the inner surface of the rear head (17) is matched and fitted with the outer surface of the rear bottom (12) after bulging;

wherein part of the internal pressure force of the front bottom (2) and the rear bottom (12) in the bulging process is transferred to the barrel section body (9) for stretching the barrel section to harden and deform the barrel section.

7. A reinforced bulging tank of a launch vehicle, comprising a barrel section body (9), barrel section thickening regions (5) arranged on both ends of the barrel section body (9), longitudinal reinforcing ribs (7) arranged on the inner walls of the barrel section body (9) and the barrel section thickening regions (5), and annular frames (8) and annular plates (6) which are matched and reinforced with the longitudinal reinforcing ribs (7);

wherein a front end surface of the barrel section thickening regions (5) is provided with a front bottom (2) and a front short shell (4); the front bottom (2) is connected with the barrel section thickening regions (5) through the front short shell (4);

a rear end surface of the barrel section thickening regions (5) is provided with a rear short shell (10) and a rear bottom (12); the rear bottom (12) is connected with the barrel section thickening regions (5) through the rear short shell (10);

wherein the front short shell (4) is provided with a front end frame (3);

the rear short shell (10) is provided with a rear end frame (11);

a manhole (1) is arranged in the top middle of the front bottom (2);

wherein the cross section of the annular frames (8) is in "C" shape, the cross section size is larger than the longitudinal reinforcing ribs (7), and a groove is formed across the longitudinal reinforcing ribs (7);

wherein the annular frames (8) are connected with the inner wall surface of the barrel section in the form of welding;

wherein the cross section size and axial spacing of the annular frames (8) are designed to satisfy pressure stability of the barrel section of the tank; the basic size of the annular frames (8) is unchanged in the bulging process of the tank, so that the materials after cold hardening, the materials after heat treatment hardening or other high-strength materials that can be welded with barrel sections can be selected.

8. A reinforced bulging tank of a launch vehicle, comprising a barrel section body (9), barrel section thickening regions (5) arranged on both ends of the barrel section body (9), longitudinal reinforcing ribs (7) arranged on inner walls of the barrel section body (9) and the barrel section thickening regions (5), and annular frames (8) and annular plates (6) which are matched and reinforced with the longitudinal reinforcing ribs (7);

wherein a front end surface of the barrel section thickening regions (5) is provided with a front bottom (2) and a front short shell (4); the front bottom (2) is connected with the barrel section thickening regions (5) through the front short shell (4);

a rear end surface of the barrel section thickening regions (5) is provided with a rear short shell (10) and a rear bottom (12); the rear bottom (12) is connected with the barrel section thickening regions (5) through the rear short shell (10);

wherein the front short shell (4) is provided with a front end frame (3);

the rear short shell (10) is provided with a rear end frame (11);

a manhole (1) is arranged in the top middle of the front bottom (2);

the front short shell (4), the front end frame (3) and maximum-diameter conical plates of the front bottom (2) are welded to form a structure with a cross section of a right triangle;

the rear short shell (10), the rear end frame (11) and maximum-diameter conical plates of the rear bottom (12) are welded to form a structure with a cross section of a right triangle;

wherein the length of the front short shell (4) and the rear short shell (10) is designed to satisfy the width of the end frame and the connection of the tank with other sections, and the thickness should satisfy the strength requirements under axial load.

\* \* \* \* \*